United States Patent
Reimann

[15] 3,666,315
[45] May 30, 1972

[54] CONVERTIBLE SEAT-BED FOR AUTOMOBILES

[72] Inventor: Gerhard P. Reimann, 145 George St., Toronto, 2 Ontario, Canada

[22] Filed: Aug. 10, 1970

[21] Appl. No.: 62,580

[52] U.S. Cl. ..........................296/69, 296/23 R, 296/152, 296/153, 297/115, 297/411
[51] Int. Cl. ..........................B60n 1/10
[58] Field of Search..............296/23, 63, 64, 65, 66, 69, 296/146, 152, 153; 297/115, 411; 5/327; 49/502

[56] References Cited

UNITED STATES PATENTS

| | | | |
|---|---|---|---|
| 2,005,198 | 6/1935 | Morrison | 296/63 X |
| 2,661,233 | 12/1953 | Sidel | 296/64 |
| 2,897,000 | 7/1959 | Hart et al. | 296/153 |
| 2,514,798 | 7/1950 | Rowe | 297/115 X |
| 2,782,068 | 2/1957 | Esche | 296/152 X |

Primary Examiner—Benjamin Hersh
Assistant Examiner—Leslie J. Paperner
Attorney—J. Noel Walton

[57] ABSTRACT

Recesses are provided within the doors of an automobile body structure to provide additional sleeping width for a person lying on a seat of the automobile. An intermediate sloping panel within each door separates the recess from an outwardly disposed window-receiving compartment. Usefully, arm rests which are adjustably mounted for movement between raised and lowered positions are provided. In their raised positions, the arm rests function as such while, in their lowered positions, they form extensions of the top surface of the seat portion of a seat of the automobile. Usefully, each arm rest can be adjusted into either of two lowered positions. In one such lowered position, the arm rest is disposed with its top surface parallel to but usefully slightly lower than the top surface of the seat for supporting the feet of a person lying on that seat. In its second lowered position, the arm rest is positioned so that its top surface extends upwardly and outwardly generally from the top surface of the seat to provide an inclined head-supporting pillow.

12 Claims, 12 Drawing Figures

INVENTOR:
GERHARD P. REIMANN
BY W Britton Moore
ATTORNEY

INVENTOR:
GERHARD P. REIMANN

BY Britton Moore
ATTORNEY

INVENTOR:
GERHARD P. REIMANN
BY W. Britton Moore
ATTORNEY

INVENTOR:
GERHARD P. REIMANN

BY W Britton Moore
ATTORNEY

CONVERTIBLE SEAT-BED FOR AUTOMOBILES

BACKGROUND OF THE INVENTION

The present invention relates to automobile body structures and more particularly to the provision of means in an automobile body structure so that the seats of the automobile can more effectively be used for sleeping or resting by the driver or passengers of the vehicle.

Many proposals have heretofore been made concerning the provision of automobile seats which can be used as or converted into mattresses for sleeping purposes but many of the previous proposals have involved the use of particularly complex seat-mounting structures.

It has also been proposed, particularly with regard to permitting the drivers of trucks to sleep in the cabs of their vehicles, to provide transversely extensible housings on the doors of such truck cabs. Such housings have been designed to extend transversely outwardly beyond the outer panels of the doors of the truck and internally to accommodate the driver's head and feet while he is resting on the bench-type seat in the truck cab. When not in use, such housings are retracted into the doors, for example, telescopically or hingedly so that they do not project transversely outwardly from the vehicle when the latter is being driven. With arrangements of this particular type, it has been possible to provide temporary additional sleeping length for a driver even in the relatively narrow widths available in the cabs of many trucks. Such previously proposed arrangements have, however, suffered from the disadvantage that they cannot readily be applied to automobile body structures particularly from the point of view of providing a satisfactory external appearance to the outer panels of the doors on which such structures are mounted.

In many present day automobile body structures, considerable transverse space is taken up by the doors of the automobile. Such doors are frequently as thick as seven inches or more and, although the seats provided in present day automobiles are generally not in themselves wide enough to provide adequate sleeping lengths for a person resting thereon, adequate length could in many automobiles be obtained if the additional width taken up by the thickness of each of the doors could also be utilized.

It has in the past been proposed to utilize the space available in the doors of automobiles as is made possible by the present invention but such previous proposals have precluded the use of conventional wind-down windows or have at least prevented such windows from being fully opened while the space available within the door is being utilized to provide additional sleeping space.

It is accordingly a general object of this invention to provide an automobile body structure in which the space existing between the inner and outer panels of the doors of an automobile can be utilized to increase the width available for a driver or other occupant of the automobile lying on a seat of the automobile.

More particularly, it is an important object of this invention to provide an automobile body structure in which a seat is transversely disposed between generally transversely aligned doors and in which the available sleeping width of such a seat can be extended when so required by utilization of a major portion of the space between inner and outer panels of doors of the vehicle.

Another object of this invention is to permit the use of the space available within the doors of an automobile body structure without restricting the operation of wind-down windows provided on such doors.

Yet another object of this invention in accordance with a particularly useful feature thereof is to provide adjustably mounted arm rests on the doors of an automobile body structure, the space within such doors being utilized to provide additional sleeping width for a person lying on a seat of the automobile.

Other objects of the invention will become apparent as the description herein proceeds.

SUMMARY OF THE INVENTION

This invention involves the provision of an automobile body structure of the type specified and in which each of the doors of the automobile includes an inner wall and spaced apart outwardly therefrom a continuous outer wall, of a recess within each said door to provide additional sleeping width for a person resting on a seat extending transversely between the doors.

In its broadest scope, the present invention provides an automobile body structure with generally aligned side doors movably mounted on said body structure for movement between open and closed positions and each having an inner wall and outwardly spaced apart therefrom a continuous outer wall, and which structure additionally comprises a seat transversely disposed within said automobile body structure between said side doors and having a seat portion with a top surface and a back rest; an opening in said inner wall of at least one of said doors and peripherally defining a recess extending outwardly into said door from said inner wall thereof to an intermediate panel extending inwardly and upwardly to define with said outer wall of said door a window-receiving compartment; and an upwardly facing supporting surface provided in said recess of each said door to form a transverse extension of said top surface of said seat portion of said seat when said door is in its closed position.

In accordance with a particularly useful feature of this invention, the aforementioned supporting surfaces providing outward extensions of the top surface of a seat of the automobile are usefully provided in the doors on both sides of the automobile body and are constituted by the top surfaces of arm rests, each of which is adjustably mounted on a respective one of said doors at least partially within the recess therein for movement between a lowered position in which said top surface of said arm rests forms one said transverse extension of said top surface of said seat portion of said seat when the respective door is in its closed position, and a raised position in which the arm rest functions as an actual arm rest for an occupant of the automobile.

In accordance with this particular feature of the invention, a guide means is usefully provided on each door of the automobile for supporting a respective one of said arm rests during its movement between said lowered and raised positions thereof. A first locking means provided on each said door serves to retain a respective one of said arm rests in either of its lowered and raised positions.

In accordance with another particularly useful feature of this invention, each such arm rest can usefully be moved between its raised position and either of two lowered positions. In the first such lowered position, the top surface of the arm rest is generally parallel to and generally coplanar with the top surface of the seat portion of the seat to provide a simple extension of that seat portion. Such an extension provides a support for the occupant's feet. In the second of its lowered positions, the arm rest usefully slopes upwardly and outwardly generally from the top surface of the seat portion of the seat to provide an inclined head-supporting pillow.

Other features and advantages of the invention will become apparent as the description herein proceeds.

BRIEF DESCRIPTION OF THE DRAWINGS

The invention will now be described merely by way of illustration with reference to the accompanying drawings in which.

DESCRIPTION OF THE PREFERRED EMBODIMENT

Figure 1:
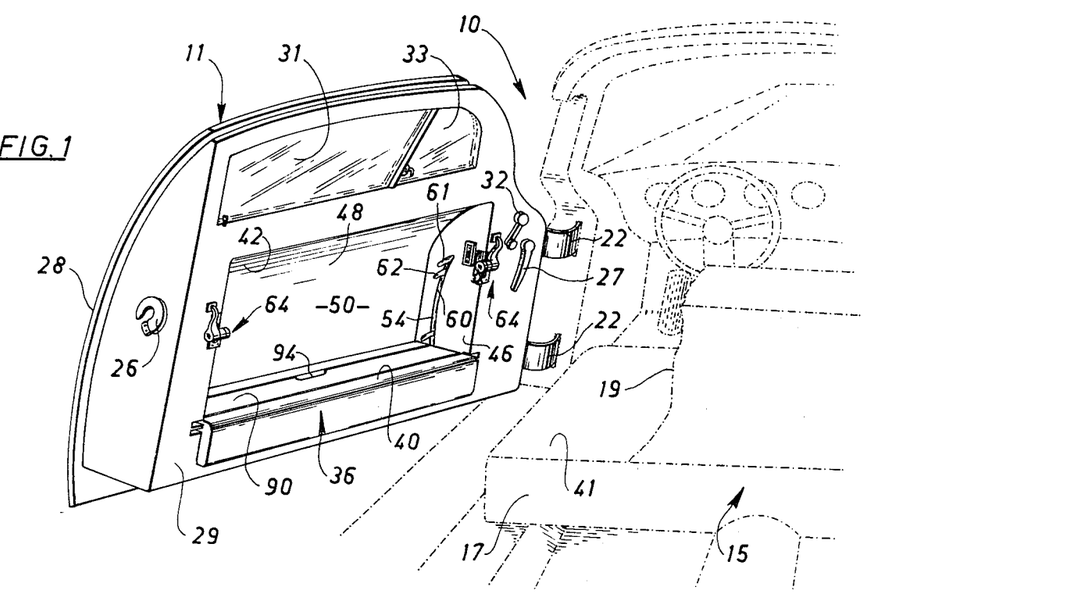
FIG. 1 is a fragmentary perspective view of the interior of an automobile constructed in accordance with this invention with certain parts being cut away, shown in phantom outline or omitted to reveal otherwise concealed structural components.
Figure 2:
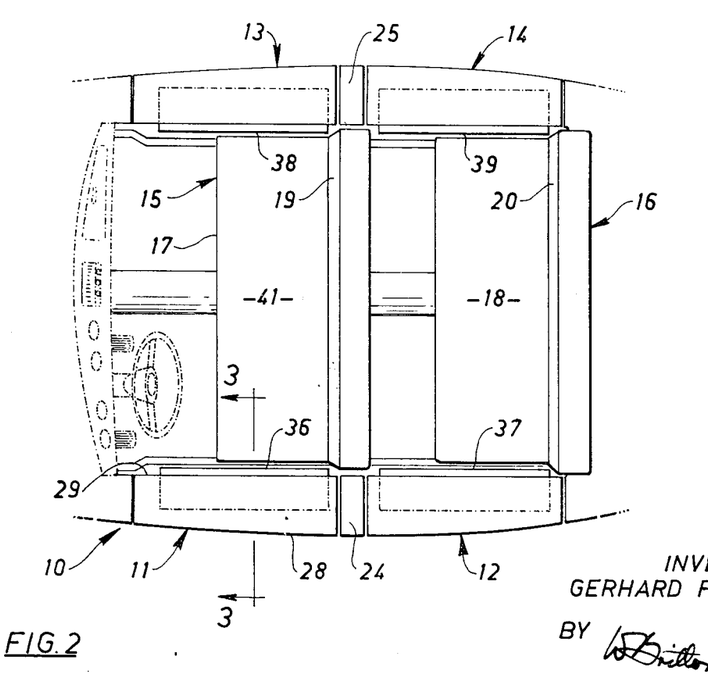
FIG. 2 is a schematic internal plan view of the automobile of FIG. 1 showing the disposition of the front and rear seats thereof with respect to the front and rear doors as well as other structural features provided in accordance with this invention.

Referring first to FIGS. 1 and 2 of the accompanying drawings, there is shown therein fragmentarily and generally at 10 an automobile body structure having front and rear doors 11 and 12 respectively on the driver's side of the vehicle and front and rear doors 13 and 14 respectively on the passenger's side of the vehicle. Disposed within the body structure 10, there are provided front and rear seats generally indicated at 15 and 16 respectively and including seat portions 17 and 18 respectively and back rests 19 and 20 respectively.

The front doors 11 and 13 are hingedly mounted as indicated generally at 22 on the body structure 10 while the rear doors 12 and 14 are hingedly mounted in any appropriate manner on central posts 24 and 25 respectively. All the doors are provided with suitable locks or latches as shown quite schematically at 26 (FIG. 1) but, since such locks form no part of the present invention, they will not be described in greater detail herein. It can, however, be noted that the door 11 is shown in FIG. 1 only as having a latch-operating handle 27 suitably mounted thereon. It will be understood that the handle 27 and the latch 26 are interconnected within the door 11 by an appropriate motion-transmitting mechanism. It should also be understood that the invention is in no way restricted to automobiles of the sedan type as illustrated and can equally be applied in the construction of other types of automobile.

Since the doors 11, 12, 13 and 14 are all constructed in essentially the same manner, the construction of only one such door will be considered in further detail herein, the ensuing description being equally applicable to all such doors. This does not mean, however, that minor variations in the structures of the various doors are precluded.

Referring, therefore, particularly to the front door 11 on the driver's side of the automobile 10, it will be seen from FIG. 1 that this door 11 is formed from a continuous outer metal wall or panel 28 and transversely inwardly spaced therefrom an inner metal wall or panel 29. The inner wall 29 is generally vertical while the outer wall 28 is generally arcuate in vertical cross section extending transversely inwardly from its base to its top edge.

Figure 3:
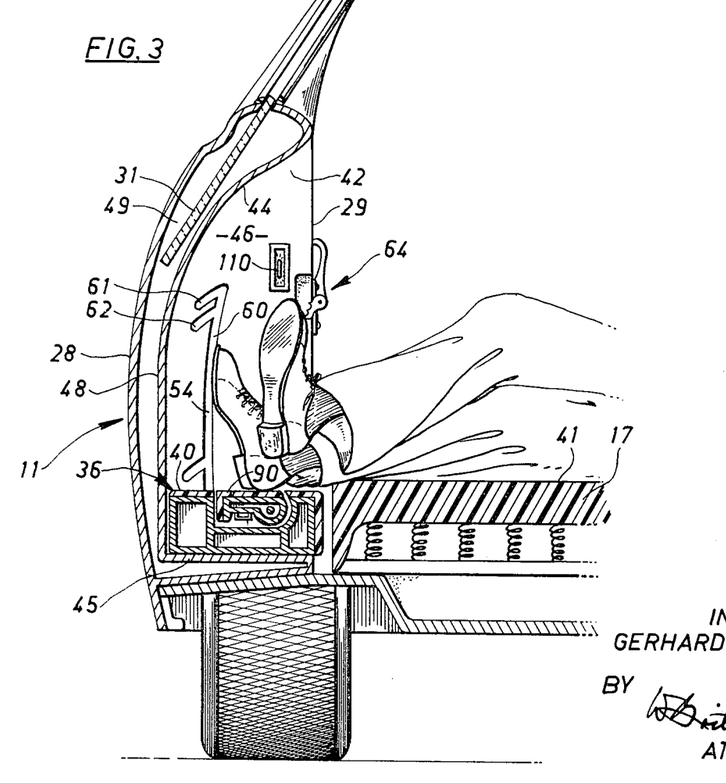
FIG. 3 is a somewhat schematic an fragmentary vertical sectional view through the front door on the driver's side of the automobile of FIGS. 1 and 2 when taken along the line 3—3 of the latter figure and showing an arm rest movably mounted on that door in accordance with a particular feature of this invention and specifically showing that arm rest disposed in a first lowered position thereof, in which lowered position a top surface of that arm rest is disposed generally parallel to and generally coplanar with but slightly lower than the top surface of the seat portion of the front seat of the automobile to form a foot-supporting extension of that front seat.
Figures 4, 10:
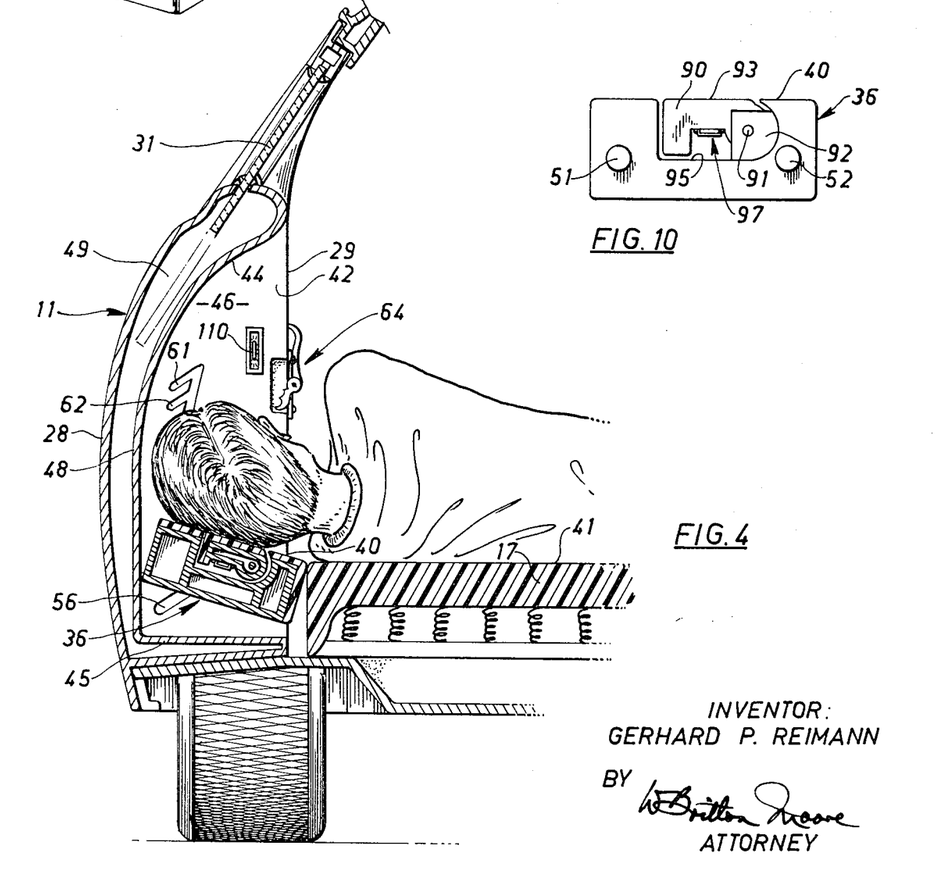
FIG. 4 is a schematic and fragmentary vertical sectional view similar to that of FIG. 3 but showing the arm rest of the front door on the driver's side of the automobile disposed in a second lowered position thereof, in which position the top surface of the arm rest extends upwardly and outwardly generally from the top surface of the seat portion of the front seat to provide an inclined head-supporting pillow.
FIG. 10 is an end elevation of the arm rest shown in FIG. 9 and showing the arm stop member in its lowered or retracted position.

In its upper portion, the door 11 is provided with a window 31 (FIG. 1) which can be raised or lowered between the positions shown in FIGS. 3 and 4, as required, by means of a window crank handle 32 (omitted from the other figures of the drawings), a suitable mechanism (not shown) being provided for transmitting motion from the handle 32 to the window 31. At the forward end of the window 31, there is usefully provided a small deflector window 33. The windows 31 and 33 may be mounted and locked using any appropriate mechanisms but it is usefully to be noted at this juncture that, for reasons which will become apparent as the description herein proceeds, the windows 31 and 33 are constructed so as to be somewhat more shallow than is presently conventional and that the window 31 is mounted so as to slope inwardly and upwardly with respect to the door 11. With such particular dimensions and disposition, the window 31 is positioned in close proximity to the outer wall 28 of the door 11 when that window is lowered as will readily be understood by reference to FIGS. 3, 4 and 5 of the accompanying drawings.

Figures 5, 12:
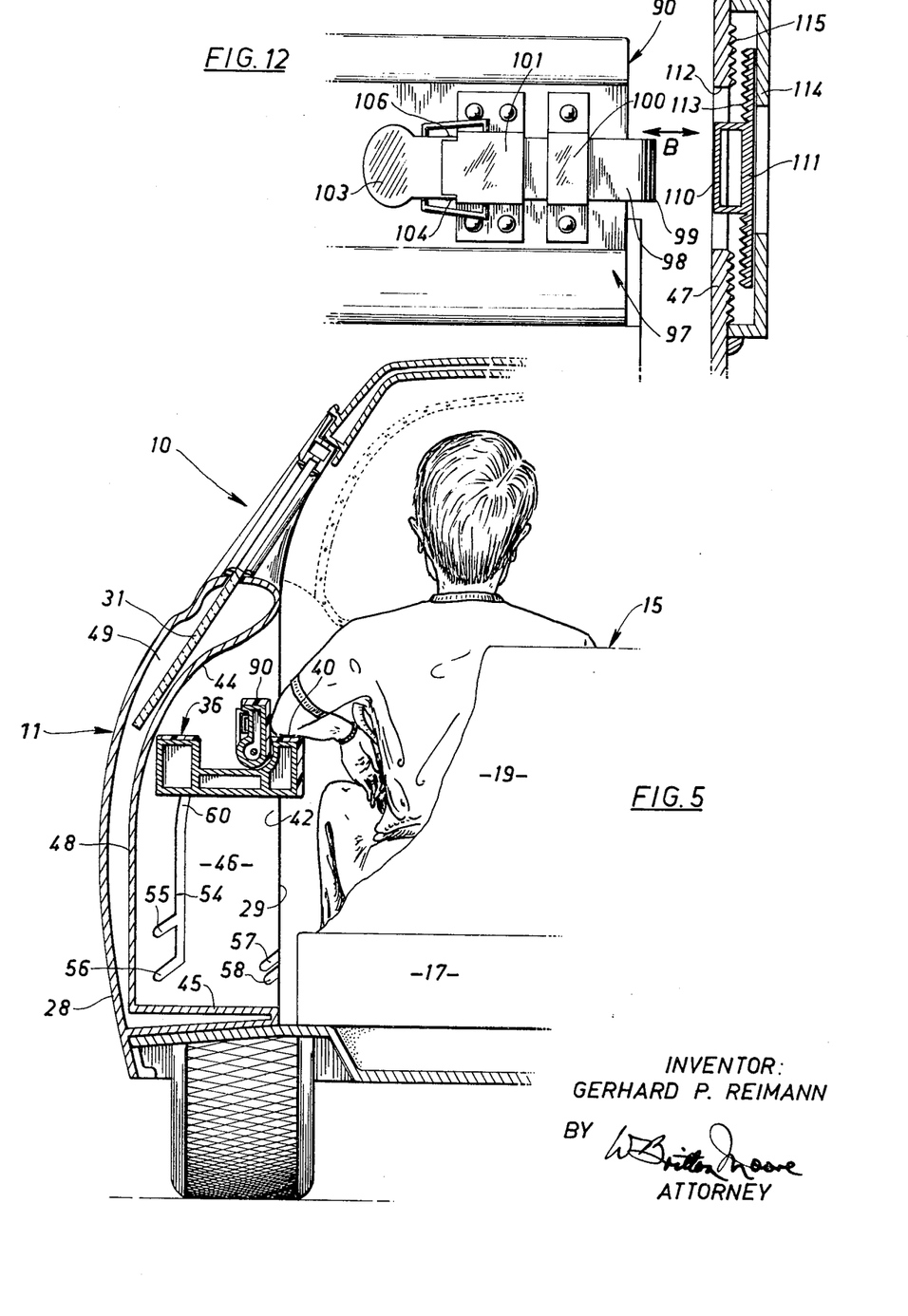
FIG. 5 is another schematic and fragmentary vertical sectional view through the front side door on the driver's side of the automobile of FIGS. 1 and 2, similar to those of FIGS. 3 and 4, and showing the arm rest of that door disposed in its raised position, in which position it functions as an actual arm rest for an occupant, such as a driver, of the vehicle.
FIG. 12 is a fragmentary outside elevation of the clamping or locking means of FIG. 11 when viewed as indicated by the arrows 12—12 of that figure and also showing in section and in exploded disposition relative thereto a co-operating locking means provided on an adjacent panel of the automobile door.

Adjustably mounted on the door 11 in a manner to be described in greater detail hereinafter, there is provided an arm rest generally indicated at 36. Similarly, arm rests generally indicated at 37, 38 and 39 are adjustably mounted on the doors 12, 13 and 14 respectively. Each of the arm rests 36, 37, 38 and 39 is adjustably mounted on a respective one of the doors 11, 12, 13 and 14 for movement between a raised position and either of two lowered positions. The arm rest 36 is shown in FIG. 5 as being disposed in its raised position in which it actually functions as an arm rest while, in FIG. 3, the arm rest 36 is shown as being disposed in the lower one of its two lowered positions. In this lowermost position, a top surface 40 of the arm rest 36 is usefully disposed parallel to but slightly lower than a top surface 41 of the seat portion 17 of the adjacent seat 15. In this way, a person sleeping or resting on the front seat 15 can rest his feet on the arm rest 36 as shown schematically in FIG. 3. Since the seat portion 17 is likely to be more compressed by the weight of the person resting thereon than is the arm rest 36, such slight difference in the positions of the top surfaces 40 and 41 is desirable.

In FIG. 4 of the accompanying drawings, the arm rest 36 is shown as being disposed in the higher one of its two lowered positions and, in accordance with a particularly useful feature of this invention, when the arm rest 36 is disposed in this intermediate position, the top surface 40 thereof usefully extends upwardly and outwardly generally from the top surface 41 of the seat portion 17 of the seat 15 so as to provide an inclined head-supporting pillow as will readily be understood by reference to FIG. 4.

The manner in which the arm rest 36 is mounted on the door 11 for movement between the various positions already identified and the means provided for retaining the arm rest in each of these several positions will next be described. Before so proceeding, however, it should perhaps be noted that, with the door 11 closed as shown, for example, in FIG. 5, there is a small space or gap, for example of about one to two inches, between the inner panel 29 of the door 11 and the adjacent side edge of the seat portion 17 of the seat 15. With the arm rest 36 disposed in either of its two lowered positions as illustrated in FIGS. 3 and 4, the means provided for mounting that arm rest 36 on the door 11 are adapted to cause the arm rest to project inwardly beyond the inner wall 29 of the door 11 so as substantially to bridge that gap.

Referring now in greater detail to the structure of the door 11, it will be seen from FIG. 1 that a relatively large opening generally indicated at 42 is provided in the inner wall or panel 29 and that upper and lower webs or panels 44 and 45 respectively and spaced apart, front and rear side webs or panels 46 and 47 (FIG. 12) extend transversely outwardly from the inner wall 29 to an outer or intermediate panel 48 of which the upper panel 44 provides an inward and upward extension defining with the outer wall 28 of the door 11 a window-receiving compartment generally indicated at 49. The intermediate panel 48 is disposed in close proximity to the outer wall 28 of the door 11 so as to define a relatively large volume recess generally indicated at 50 and in which the arm rest 36 is at least partially mounted for vertical movement between its various positions already discussed.

On each of its two ends, the arm rest 36 is provided with two transversely spaced apart and terminally extending guide pins 51 and 52. The outer guide pin 51 at each end of the arm rest 36 is received in an upwardly extending slot-like opening 54 provided for this purpose in each respective one of the side panels 46 and 47.

Referring particularly to FIG. 5, it will be seen that in proximity to its lower end, each of the openings 54 is formed with upper and lower, outwardly extending and downwardly sloping detent slots 55 and 56 respectively. Corresponding upper and lower detent slots 57 and 58 are provided in the inner wall 29 and in the inner edges of each of the side panels 46 and 47 for receiving respective ones of the inner guide pins 52. The detent slots 57 and 58 extend outwardly from the inner edges of the respective ones of the side panels 46 and 47 and the slots 56 and 58 downwardly terminate at essentially the same level so that, when the guide pins 51 and 52 respectively are disposed therein, the arm rest 36 is positioned in its lowermost level position as shown in FIG. 3. Each of the slots 55 terminates downwardly somewhat above the bottom of the opposite slot 57 so as to provide the desired slope for the arm rest 36 when that member is disposed in its intermediate position as shown in FIG. 4. Upwardly of the detent slot 55, each of the slot-like openings 54 curves inwardly as indicated at 60 and is provided at its upper end with downwardly and outwardly sloping detent slots 61 and 62, which are vertically spaced apart a small distance to permit some adjustment of the position of the arm rest 36 when it is actually being used as such as shown in FIG. 5 of the accompanying drawings.

By curving each of the slot-like openings 54 inwardly as at 60, the arm rest 36 is itself caused to be shifted inwardly as it is raised to the position shown in FIG. 5. In this way, adequate arm-supporting width is provided inwardly of the inner wall or panel 29 of the door 11. By curving each of the slot-like openings 54 inwardly at 60 as described, sufficient space is available between the outer and inner panels 28 and 29 respectively of the door 11 to allow the provision of the aforementioned window-receiving compartment 49 and so to allow movement of the window 31 between its open and closed positions.

Since the arm rests such as the arm rest 36 might well in practice be used as hand grips for pulling the doors of the automobile 10 into their closed positions, each of the arm rests such as the arm rest 36 is adapted to be locked or clamped in its raised position. Latch or locking means, each of which is generally indicated at 64, are provided for releasably engaging the inner pins 52 on each end of the arm rest 36 when that arm rest is disposed in its raised position as shown in FIG. 5. The structure of the latch or locking means 64 will now be described with particular reference to FIGS. 6, 7 and 8 of the accompanying drawings. It should perhaps, however, be explained at this juncture that two such latch means 64 will be provided on each of the doors 11, 12, 13 and 14 for clamping engagement with the inner pins 52 at the two ends of each of the arm rests. The two latch means 64 provided on each door will be identical except that one will of course be a mirror image of the other.

Figure 6:
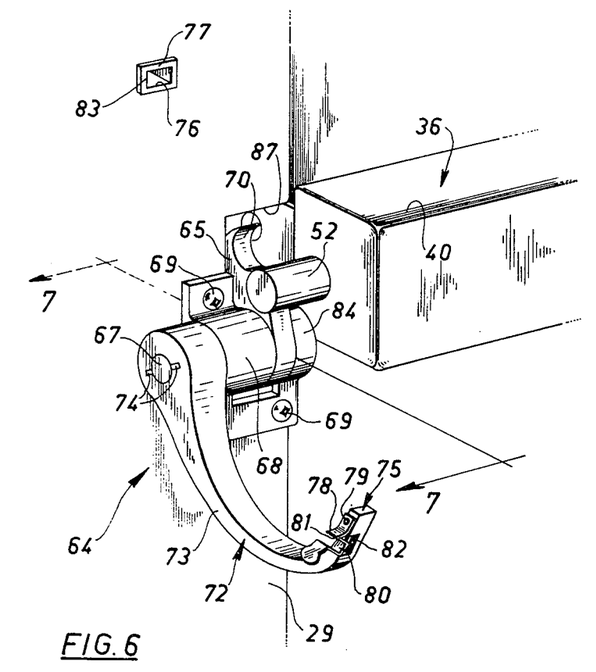
FIG. 6 is an enlarged perspective view showing one form for a releasable locking means provided in the automobile of the preceding figures for retaining one of the arm rests of that vehicle in its raised position as actually shown in FIG. 5.
Figure 7:
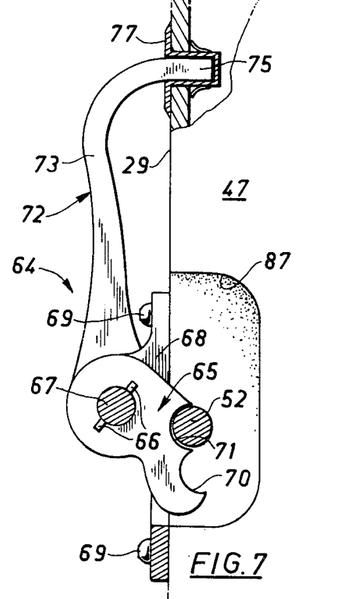
FIG. 7 is a transverse vertical sectional view through the locking means of FIG. 6 when taken as indicated by the arrows 7—7 of FIG. 6 and showing that locking means in its locked position.
Figure 8:
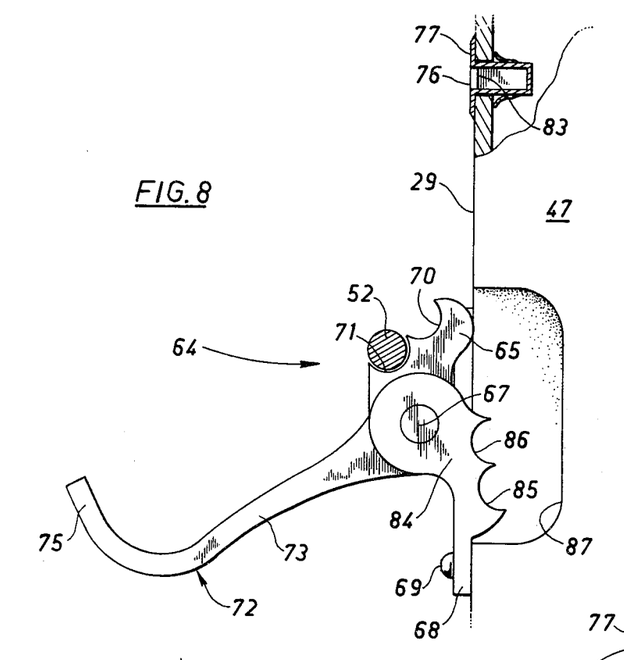
FIG. 8 is a front end elevation of the locking means of FIGS. 6 and 7 but showing that locking means in its released position.

The latch means 64 shown in FIGS. 6, 7 and 8 is the one used for clamping the inner guide pin 52 at the rearward end of the arm rest 36 on the front door 11 on the driver's side of the automobile 10 shown in the accompanying drawings. It will be seen that this latch means 64 includes a crank arm generally indicated at 65 and keyed at 66 to a shaft 67 which is journalled in a mounting bracket 68 which is in turn suitably secured on the inner wall 29 of the door 11, for example, by screws 69.

The crank arm 65 is formed in one surface with two generally semi-cylindrical recesses 70 and 71 within which a respective one of the inner guide pins 52 can be received for the purpose of maintaining the arm rest 36 in its raised position as shown in FIG. 5 when the latch means 64 is in its locking position as shown in FIG. 7.

As will be more readily understood as the description herein proceeds, the provision of the two pin-receiving recesses 70 and 71 is advantageous in that it provides some degree of adjustability and compensation for wear in the latching means 64 as well as permitting the disposition of a respective one of the outer guide pins 51 in either of the aforementioned detent slots 61 and 62 as required.

A goose-neck arm 72 with a curved handle section 73 is keyed at 74 to the aforementioned shaft 67 for the purpose of permitting manual movement of the crank arm 65 between its released and locking positions as shown in FIGS. 6 and 8, and 7 respectively.

At its free end, the arm 72 is formed with a generally rectangular section locking pin 75 which is received within a corresponding opening defined by an aperture 76 in a striker plate 77 suitably secured on the inner wall 29 of the door 11. Along one of its side edges, the locking pin 75 has a detent leaf spring 78 riveted thereto at 79 and urged resiliently outwardly away from the pin 75 to the position shown in FIG. 6. The spring 78 is formed with an inset portion 80 carried by a web 81 and which is received within a corresponding notch 82 formed in the locking pin 75 as will readily be understood by reference to FIG. 6.

When the pin 75 is moved into the aperture 76 in the striker plate 77, the web 81 is received behind an edge 83 of the aperture 76 so as to retain the latch means 64 in its locking position with the inner guide pins 52 of the arm rest 36 engaged in appropriate ones of the recesses 70 and 71 of the front and rear locking means 64 on the door 11 in a manner which will be more readily understood when the operation of such a locking means 64 is described in greater detail as the description herein proceeds. When it is required to release the locking means 64 to allow the position of the arm rest 36 to be adjusted, all that is necessary is to press the detent leaf spring 78 and to pivot the arm 72 from the position shown in FIG. 7 to that shown in FIGS. 6 and 8.

Referring further to the structure of the locking means 64, it will be noted therefrom that the mounting bracket 68 is integrally formed with a fixed arm 84 which is itself provided with generally semi-cylindrical pin-supporting recesses 85 and 86 which are aligned with the aforementioned recesses 70 and 71 respectively when the arm 72 is moved into its locking position as shown in FIG. 7. The crank arm 65 is mounted on the shaft 67 for movement in a space between the mounting bracket 68 and the fixed arm 84 while the shaft 67 is freely journalled in the arm 84 as will readily be understood by reference to FIG. 8 of the accompanying drawings.

It will also be noted that the inner wall 29 of the door 11 and the rear panel 47 of the recess 50 are cut away at 87 to permit the required movement of the crank arm 65 on movement of the handle arm 72.

In the operation of each of the locking means 64 for the purpose of securing the arm rest 36 in its raised position, the handle 72 of such a locking means 64 is first moved into its released position as shown in FIGS. 6 and 8 and as already explained. The arm rest 36 is then raised by hand with its outer guide pins 51 guided in respective ones of the slot-like openings 54. As the guide pins 51 pass through the curved portions 60 of the openings 54, the arm rest 36 is moved transversely inwardly relative to the door 11 so that, on continued elevation of the arm rest 36, the inner guide pins 52 are displaced sufficiently inwardly of the door 11 that they can move upwardly past each of the mounting brackets 68 inwardly thereof. The arm rest 36 can then be pushed outwardly until the inner guide pins 52 are received in either of the recesses 70 and 71 of the crank arms 65 of both the front and rear locking means 64. During such outward movement of the arm rest 36, the outer guide pins 51 are received slightly within appropriate ones of the aforementioned detent slots 61 and 62 so to prevent the arm rest 36 falling out of its raised position.

By the application of further outward manual pressure to the arm rest 36 and by pivoting the handle arms 72 of the front and rear locking means 64 upwardly, the outer guide pins 51 are moved outwardly further into the detent slots 61 or 62.

On completion of the pivoting of the handle arms 72 to their locked positions, the inner guide pins 52 are supported in the recesses 70 or 71 and, when the locking operation is complete, further support for the inner guide pins 52 is provided by the recesses 85 or 86 in the fixed arms 84. It is to be noted that, when the locking means 64 are disposed in their locked positions, the inner guide pins 52 are positioned below the axes of the shafts 67 thereby reducing the risk of accidental unlatching of the locking means 64. As already explained, the handle arm 72 is further retained in its locked position by the engagement of the detent leaf spring 78 in the aperture 76 of the striker plate 77. This additional locking is desirable since the handle 72 may well be used as a means for closing the door 11.

In accordance with another useful feature of this invention, each of the arm rests 36, 37, 38 and 39 is provided with an arm stop member generally indicated at 90 and which is mounted on a respective one of the arm rests so that it can be moved between a retracted position in which it is disposed generally within that arm rest and an extended position in which it extends upwardly from the top surface 40 of the arm rest somewhat outwardly of the inner edge of that surface so as to provide a vertical surface against which an occupant such as the driver of the automobile 10 may rest his forearm when the arm rest is disposed in its uppermost position as shown in FIG. 5.

One particular structure for such an arm stop member 90 will now be described herein in greater detail with reference to FIGS. 9, 10, 11 and 12 of the accompanying drawings. It will first be noted that the arm stop member 90 is very slightly shorter than the arm rest 36 and is pivotally mounted thereon about a pivot shaft 91 which is suitably journalled in end plates 92 secured to the arm rest 36 at each end thereof. When the arm stop member 90 is disposed in its retracted position as shown in FIGS. 1, 3, 4 and 10, a top surface 93 of that member is disposed so as to be substantially coplanar with the top surface 40 of the arm rest 36. In this way, the arm rest 36 presents a substantially uninterrupted top surface as is desirable when that arm rest is disposed in either of its two lowered positions as shown in FIGS. 3 and 4. The arm stop member 90 is, however, centrally cut away as at 94 (FIG. 1) to provide a handhold to allow the member 90 to be gripped for moving it out of its retracted position (FIG. 10) and into its extended or raised position (FIGS. 9 and 11).

Figure 9:
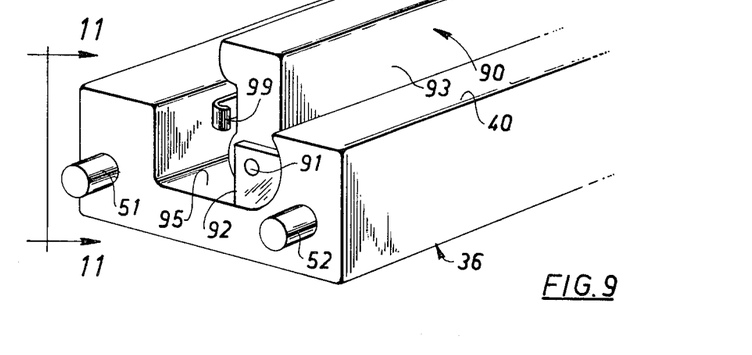
FIG. 9 is a fragmentary perspective view from one end of one of the arm rests provided on one of the doors of the automobile of the preceding figures and particularly showing a pair of terminally projecting pins provided on that arm rest for guiding it during its movement between its raised and lowered positions and also showing an arm stop member usefully provided on that arm rest in accordance with another particularly useful feature of this invention, such arm stop member being shown in its raised or extended position.
Figure 11:
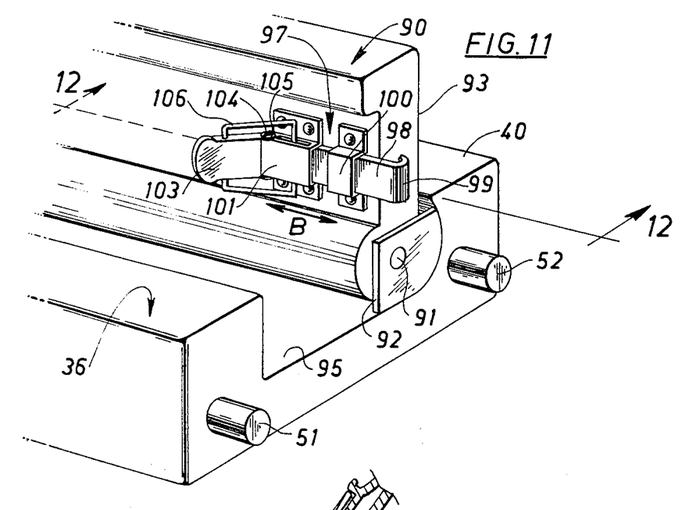
FIG. 11 is a fragmentary perspective view of the arm rest of FIG. 9 when viewed as indicated by the arrows 11—11 of that figure and showing one of two clamping or locking means provided on the arm stop member of that arm rest for the purpose of locking the arm stop member in its extended or raised position when the arm rest on which it is mounted is itself disposed in its raised position.

It will further be seen from FIGS. 9, 10 and 11 that the arm rest 36 is formed with a recess 95 for accommodating the arm stop member 90 when the latter is disposed in its retracted position.

The arm stop member 90 is provided at each of its ends and on its outer surface (when in its extended or raised position) with a latching means generally indicated at 97 and by means of which that arm stop member 90 can be clamped in its raised position when the arm rest 36 is itself disposed in either of its two raised positions (FIG. 5). Each of the latching means 97 comprises a simple toggle action latch of the type conventionally used on luggage and including a latch bolt 98 terminating in a hook portion 99 and slidably mounted in saddle sleeves 100 and 101. A latch-operating handle 103 is pivotally mounted at 104 between lugs 105 integrally formed with the saddle sleeve 101 and a bent wire linkage 106 extends generally from the free end of the handle 103 to the latch bolt 98 in a conventional manner so that, on pivotal movement of the handle 103 about the pivot 104, the latch bolt 98 is moved in the direction indicated by the double-headed arrow B in FIGS. 11 and 12.

The latching means 97 will normally be provided with a resilient detent means of any conventional type and not shown in the accompanying drawings, which detent means serves to urge the latch bolt 98 to remain in either of its locked and released positions.

Mounted in a manner yet to be explained in each of the front and rear panels 46 and 47 respectively of the door 11, there is provided a staple 110 secured in any appropriate manner to a plate 111. The staple 110 is releasably engaged by the hook portion 99 of a respective one of the latching means 97 for retaining the arm stop member 90 in its elevated or extended position. The plate 111 is slidably mounted behind a respective one of the front and rear panels 46 and 47 respectively so that the staple 100 extends into a generally rectangular aperture 112 formed in that panel. The outer surface of the plate 111 is serrated or otherwise roughened as at 113 for frictional engagement with corresponding serrations formed on the inner surface of the panel 47 about the aperture 112 therein. A retaining frame 114 secured, for example, by welding, to the inner surface 115 of the panel 47 holds the plate 111 in position when the latching means is locked but allows limited vertical and transverse movement of that plate 111 and consequently of the staple 110 into a suitable position for engagement by the hook portion 99 of the latch bolt 98 when the arm rest 36 is disposed in either of its two raised positions and the latching means 97 is released.

In use, the arm rest 36 is first raised into a desired one of its two raised positions in the manner already explained and, having inserted the guide pins 51 and 52 of that arm rest 36 into the desired pair of the upper detent slots 61 and 62 (FIG. 3) and into desired ones of the recesses 70 and 71 of the locking means 64 at each end of the arm rest 36, the latter means are operated in the manner already explained to clamp the arm rest 36 in its raised position. The arm stop member 90 is then pivoted upwardly about the pivot shaft 91 into its elevated position as shown in FIG. 9. Each of the staples 110 is then moved manually within its retaining frame 114 until it is correctly positioned for engagement by the hook portion 99 of a respective one of the latch bolts 98. The corresponding latch-operating handles 103 are then operated to pull the respective plates 111 into gripping engagement with the serrated portions of the inner surfaces 115 of the panels 46 and 47 so to hold the arm stop member 90 firmly in its elevated position.

Although the invention has been described with particular reference to the automobile body structure shown in the accompanying drawings, it should be understood that the invention is equally applicable to automobile body structures differing in many ways from the illustrated structure.

Merely by way of illustration, it can be indicated that the adjustable arm rests of this invention may be provided in both the front and rear doors of an automobile body structure or simply in one such set of doors. Similarly, such arm rests may be provided on one or both sides of an automobile although the provision of such arm rests on both sides of an automobile will generally be desirable to provide the greatest possible sleeping space.

Similarly, it is not essential in accordance with this invention to provide the retractable arm stop members hereinbefore described. Furthermore, latching means other than the latching means 64 hereinbefore described can be utilized without departing from the scope of the invention.

What I claim is:

1. An automobile body structure with generally aligned side doors movably mounted on said body structure for movement between open and closed positions and each having an inner wall and outwardly spaced apart therefrom a continuous outer wall, and which structure additionally comprises a seat transversely disposed within said automobile body structure between said side doors and having a seat portion with a top surface and a back rest; a window movably mounted in each said door for movement between a raised closed position and a lowered open position; an opening in said inner wall of at least one of said doors and peripherally defining a recess extending outwardly into said door from said inner wall thereof to an intermediate panel including a generally upright lower portion and an inwardly and upwardly extending upper portion defining with said outer wall of said door an obliquely disposed window-receiving compartment; and an upwardly facing supporting surface provided in said recess of said door to form a transverse extension of said top surface of said seat portion of said seat when said door is in its closed position.

2. An automobile body structure which comprises generally aligned side doors movably mounted on said body structure for movement between open and closed positions and each having an inner wall and outwardly spaced apart therefrom a continuous outer wall; a seat transversely disposed within said automobile body structure between said side doors and having a seat portion with a top surface and a back rest; an opening in said inner wall of at least a first one of said doors and peripherally defining a recess extending outwardly into said first door from said inner wall thereof to an intermediate panel extending inwardly and upwardly to define with said outer wall of said first door a window-receiving compartment; an upwardly facing supporting surface provided in said recess of said first door to form a transverse extension of said top surface of said seat portion of said seat when said first door is in its closed position, said supporting surface being provided as a top surface of an arm rest which is adjustably mounted on said first door at least partially within said recess therein for movement between a lowered position in which said top surface of said arm rest forms said transverse extension of said top surface of said seat portion of said seat and a raised position in which said arm rest functions as an actual arm rest for an occupant of the automobile; a guide means on said first door for supporting said arm rest for movement thereof between said lowered and raised positions thereof; and first locking means on said first door for retaining said arm rest in either of said lowered and raised positions thereof.

3. An automobile body structure as claimed in claim 2 in which said transverse extension of said top surface of said seat portion of said seat is provided in each of said side doors.

4. An automobile body structure as claimed in claim 2 in which said arm rest is adjustably mounted on said first door for movement between said raised position thereof and a first lowered position in which said top surface of said arm rest is generally parallel to and generally coplanar with said top surface of said seat portion of said seat and a second lowered position in which said top surface of said arm rest extends transversely outwardly and upwardly generally from said top surface of said seat portion of said seat to provide an inclined head-supporting pillow.

5. An automobile body structure as claimed in claim 2 in which said arm rest has retractably mounted thereon an arm stop member adapted to be moved between an extended position in which it projects upwardly from said arm rest and a retracted position within the body of said arm rest.

6. An automobile body structure as claimed in claim 5 which additionally comprises co-operating second locking means on said first door and on said arm stop member for releasably retaining said arm stop member in said extended position thereof when said arm rest is disposed in said raised position thereof.

7. An automobile body structure as claimed in claim 2 in which said arm rest is adjustably mounted on said first door for movement between said raised and lowered positions thereof while projecting inwardly of said inner wall of said first door into the interior of said automobile body structure.

8. An automobile body structure as claimed in claim 2 in which said recess in said first door is defined by spaced apart side walls extending outwardly into said first door to said intermediate panel thereof from said inner wall thereof.

9. An automobile body structure as claimed in claim 8 in which said guide means comprises at least one upwardly extending elongated opening formed in each of said side walls defining said recess in said first door and corresponding guide pins terminally projecting from said arm rest and received within respective ones of said upwardly extending elongated openings for movement therealong.

10. An automobile body structure as claimed in claim 9 in which each said upwardly extending elongated opening has such a configuration that said arm rest is guided thereby during elevating movement from said lowered position to said raised position thereof and is simultaneously moved at least partially inwardly out of said recess in said first door.

11. An automobile body structure as claimed in claim 10 in which said arm rest is provided with a pair of said terminally projecting guide pins on each of its ends, in which one pin of each said pair is slidably received in said upwardly extending elongated opening in a respective one of said side walls defining said recess in which said arm rest moves, in which a second pin of each said pair is adapted removably to be received, when said arm rest is in said lowered position thereof, in a second opening formed in a respective one of said side walls, and in which each said first locking means comprises manually operable front and rear clamping means mounted on said first door and adapted releasably to engage respective ones of said second pins of each said pair of guide pins when said arm rest is disposed in said raised position thereof thereby releasably to retain said arm rest in said raised position.

12. An automobile body structure as claimed in claim 2 in which front and rear doors are hingedly mounted on said body structure in general alignment with front and rear seats thereof and on each side thereof, and in which one said arm rest is adjustably mounted on each of said front and rear doors.

* * * * *